Dec. 23, 1941.  H. L. BLOOD  2,267,186
SIZE CONTROLLING MECHANISM FOR BORING MACHINES AND THE LIKE
Original Filed Aug. 3, 1938
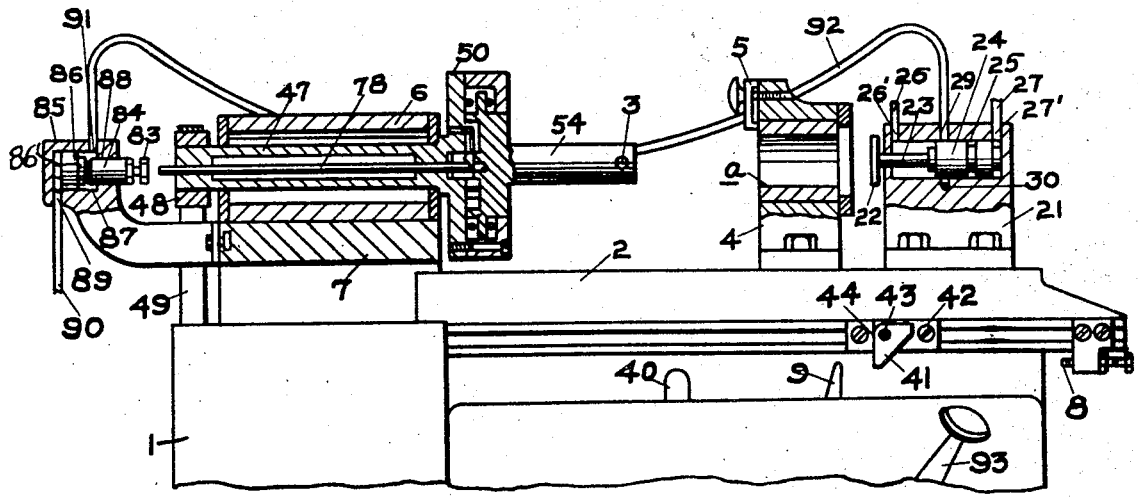
Fig. 1
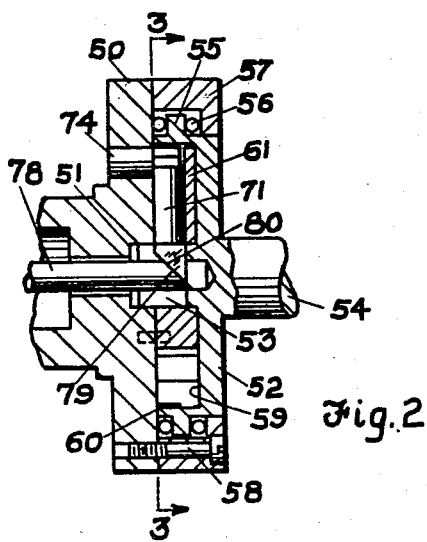
Fig. 2
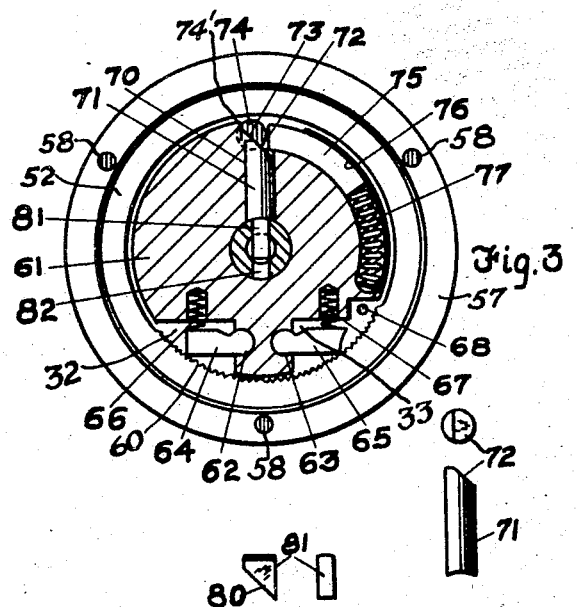
Fig. 3
Fig. 5
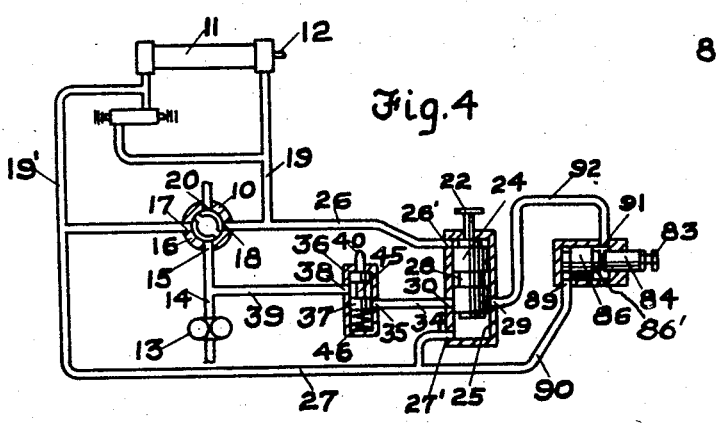
Fig. 4
Inventor
Harold L. Blood
Attorney Patented Dec. 23, 1941

2,267,186

UNITED STATES PATENT OFFICE 2,267,186

SIZE CONTROLLING MECHANISM FOR BORING MACHINES AND THE LIKE

Harold L. Blood, Worcester, Mass., assignor to The Heald Machine Company, Worcester, Mass., a corporation of Massachusetts Continuation of application Serial No. 222,858, August 3, 1938. This application June 1, 1939, Serial No. 276,845

17 Claims. (Cl. 77—3)

The present invention relates to machines which are used to impart a predetermined finished dimension to corresponding surfaces of a succession of similar workpieces, and the invention is particularly applicable to boring machines where it is customary for the cutting tool to operate on a relatively large number of successive workpieces before there is need to make any adjustment of the tool to compensate for the wearing-away of its cutting surface. This application is a continuation of my Serial No. 222,858, filed August 3, 1938, for Size-controlling mechanism for boring machines and the like.

In machines of this character the initially established position of the cutting tool relative to the axis of the workholder for the production of a succession of workpiece bores of a predetermined finished size can generally be maintained without adjustment during the machining of quite a number of successive workpieces by reason of the fact that the tool is of extremely hard material and can operate for a considerable time before perceptible wear occurs. After repeated machining operations are performed by the tool, however, the latter does wear down to such an extent that it is no longer capable without readjustment of imparting the desired finished dimension to the subsequently presented workpieces, since such dimension is dependent upon the distance of the cutting surface of the tool from the axis of rotation of the tool or of the workpiece, as the case may be. Adjustment of the tool is then essential if the successive workpieces are all to be finished to the same established dimension.

In the Blood Reissue Patent No. 20,634 of January 25, 1938, as well as in my copending companion application Serial No. 220,566, filed July 21, 1938, is disclosed a boring machine organization wherein at the completion of each boring operation, a gage or calipering mechanism is automatically brought into action to test the finished dimension of the workpiece then in the machine, said mechanism being wholly without influence on the tool in all cases where the desired finished size of the so-tested workpieces has been attained, but said mechanism functioning to produce a wear-compensatory adjustment of said tool if and when the so-tested workpiece has not been finished to the desired size.

My present invention provides a similarly-functioning organization adapted to give, when needed, a wear-compensatory adjustment or repositioning of the tool, and it utilizes in large measure the same instrumentalities for causing the tool, at the completion of the boring stroke or traverse of each workpiece, to be backed off positively from the finished workpiece surface, so the latter will not be marred or scratched by the tool on the reverse or withdrawal stroke.

Other and further objects and advantages of the invention will appear from the following detailed description taken in connection with the accompanying drawing, in which—

Fig. 1 is a front elevation of a machine embodying the invention, certain of the parts being in section to show the construction.

Fig. 2 is an enlarged vertical section through the end of the tool spindle.

Fig. 3 is a sectional view along the line 3—3 of Fig. 2.

Fig. 4 is an hydraulic diagram.

Fig. 5 is a detailed showing of certain of the parts utilized in the tool structure.

Like reference characters refer to like parts in the different figures.

With reference first to Fig. 1, the invention is shown in connection with a precision boring machine of well known type, as for example, a machine somewhat similar to that of the Blood reissue patent above referred to. In the illustrated machine a base 1 supports a horizontally movable table 2 slidable on ways, not shown, and actuated in any suitable way, as by fluid under pressure to produce a relative traversing movement between a rotary cutting tool 3 and a workpiece $a$ for a longitudinal movement through the workpiece bore of the rotary tool. To obtain this relative movement, either the tool or the workpiece may be carried by the table; as here shown, by way of example, the movable table carries a suitable workholder 4 in which the workpiece $a$ is secured, as by a suitable clamp 5. The tool 3 is rotatively supported in a tool head 6 mounted on a bridge 7 which spans the guideways provided by the machine base. The boring operation occurs when the table 2 moves to the left from the position shown in Fig. 1, to subject the workpiece bore, for its entire length, to the cutting action of the rotating tool 3. The table then reverses, moving back to the position shown in Fig. 1, to permit replacement of the finished workpiece by the next workpiece to be operated upon. The reversal of the table 2 is effected when a dog 8 on said table engages a reversing lever 9 which is operatively connected to a reversing valve 10 (Fig. 4) provided in the fluid pressure system by which said table 2 is actuated; such engagement shifts the reversing valve into the position shown by Fig. 4, and causes movement of the table to the right to carry the workpiece to the inoperative position shown by Fig. 1. As the returning table reaches the position of Fig. 1 it is brought to rest by any suitable means, not shown.

Referring now to Fig. 4, the fluid pressure mechanism by which the table is actuated comprises a cylinder 11, mounted within, and held in fixed relation to, the base of the machine. A projecting rod 12 secured to a piston, not shown within said cylinder, is suitably connected to the table 2. Fluid under pressure from a pump 13 is directed through a conduit 14 to an inlet port 15 in the casing 16 of reversing valve 10. Ports 17 and 18 in the casing are connected to the opposite ends of the cylinder 11 by pipes 19 and 19' and the casing 16 is also provided with an outlet port 20. In response to movements of the valve 10 by the reversing lever 9, fluid under pressure is directed alternately to opposite ends of the cylinder 11 to provide for the longitudinal traversing movements of the table.

Referring now to Fig. 1, each successive workpiece a is supported with its axis substantially horizontal in the workholder 4, and a housing 21 is mounted on the table in line with the workholder 4 to support a gage 22 in accurate alinement with the bore of the workpiece. The gage is carried by a gage rod 23 extending from a plunger 24 slidable in a horizontal bore 25 in the housing 21. The gage member 22 corresponds in size or diameter to the desired finished dimension of the workpiece bore, and is arranged to be brought into operative relation to each workpiece in the machine, immediately following the action of the rotary boring tool 3 thereon.

With reference again to Fig. 4, the plunger which carries the gage rod is moved toward and away from the workpiece by fluid under pressure. A conduit 26 provides a connection between the pipe 19 and a port 26' at the inner or left hand end of the bore 25 (the upper end Fig. 4) and a pipe 27 provides a connection between the pipe 19' and a port 27' at the outer or right hand end of the bore 25 (the lower end, Fig. 4). Thus, as the table moves to the left to bring the tool and workpiece into operative relation, fluid under pressure is directed to the left hand end of the bore 25 to hold the gage away from the workpiece and, as the reversing valve is shifted at the left hand end of the table movement, fluid under pressure is directed to the right hand end of the bore 25 to cause a movement of the gage to the left for entry within the workpiece bore if the latter is finished to the desired size.

The gage-moving plunger 24 acts also as a valve, and to this end has a centrally located groove 28 which in the above-described extreme positions of said plunger is out of line with opposed ports 29 and 30 opening from the bore 25 of housing 21. The groove 28 comes into line with the ports 29 and 30 only when the gage 22, on its leftward movement, is unable to enter the workpiece bore, as will hereinafter appear. The port 30 is connected by a conduit 34 to a port 35 in a casing 36 (Fig. 4) which contains a vertically slidable piston valve 37, consisting of two piston portions separated by a reduced portion 45. The casing 36 has a port 38 connected by a conduit 39 to the conduit 14 between the pump 13 and the reversing valve casing 16.

The valve 37 has an upwardly projecting stem 40, which, as best shown in Fig. 1, is in a position to be engaged by a pivotally mounted dog 41 carried by a block 42 laterally adjustable on the front of the table. The dog 41 is pivoted on a pin 43 and is free to rock counterclockwise to allow the dog to pass without effect over the upper end of the stem 40 during each movement of the table to the left. Upon each reverse movement of the table to the right, however, the swinging movement of the dog 41 is limited by a shoulder 44 on the block and thus the dog forces the valve 37 downwardly to establish momentarily a fluid connection around the reduced portion 45 of the valve from port 38 to port 35, thereby connecting the conduits 34 and 39. The valve 37 is normally held in the upper position shown by a coil spring 46.

If the gage 22, on its above-described movement to the left as the tool 3 withdraws from a workpiece bore, is unable to enter said bore, that is, if its full movement to the left is prevented by engagement between the gage and the end of the workpiece by reason of the workpiece bore being too small, then the reduced portion of the plunger 24 establishes a fluid connection from port 30 to port 29. Then when the valve 37 is subsequently shifted downwardly by the dog 41, during movement of the table to the right, the way is open for fluid under pressure to pass from pump 13 clear through to the port 29, for the actuation, as hereinafter described, of a mechanism which automatically repositions the tool 3 so that its next-ensuing operations will produce workpiece bores of the desired size. On the other hand, whenever said gage 22 can make its full left hand movement into the bore of any workpiece that has been operated upon by the tool 3, then the ports 29 and 30 are closed off from each other by the plunger 24, in consequence of which no such tool compensating movement can take place.

Referring now to Fig. 1, the toolhead 6, which is mounted on the bridge 7, has journalled therein a rotatable hollow spindle 47, the left hand end of which carries a pulley 48 by which the spindle is rotated, as by a belt 49. On the right hand end of the spindle is an integral flange 50, Fig. 2, having a centrally located recess 51 in the end face thereof. A peripherally-flanged cap 52 has a projecting stud 53 turnably fitted in the recess, the stud being eccentric to a centrally extending stub shaft 54 on the opposite side of the cap. The stub shaft 54 carries the boring tool 3 the latter projecting radially from said shaft, in the usual manner. The rim or outer periphery 31 of the cap has a projecting flange 55 on the opposite sides of which are positioned ball bearings 56, the cap and bearings being held in position by a retaining ring 57 held against the flange 50 by bolts 58. The ball bearings 56 permit turning movement of the cap within the ring 57 and relative to the flange 50 to vary, as hereinafter described, the projection of the tool 3 from the axis of spindle 47.

The rim 31 of cap 52 surrounds a recess 59 on the same side of said cap as the stud 53, the inner peripheral surface of said rim, within the recess, being provided with a plurality of ratchet teeth 60, Fig. 3. Turnable on the stud 53 and located in the recess 59 is an annular plate 61 having a pair of angular oppositely-facing cutouts or recesses 32 and 33, the latter receiving respectively the pawls 64 and 65, which are pivotally mounted in arcuate notches 62 and 63 of said plate. Said pawls 64 and 65 are normally forced outwardly by springs 66 and 67 respectively, into engagement with the teeth 60 of cap 52, and by reason of their opposed arrangement, they prevent any relative rotative movement, in either direction, between the plate 61 and the cap 52. Projecting from the end face of flange 50, near the pawl 65, is a pin 68, which, with the occurrence of sufficient counterclockwise turning of plate 61 and cap 52 relative to spindle 47, serves to disengage the pawl 65 from the teeth 60 for a purpose to be hereinafter described.

The pawl-carrying plate 61 has a substantially radial recess 70 wherein is freely slidable a pin 71 having an oblique or bevelled outer end 72 engageable with a flattened and similarly bevelled surface 73 on a pin 74 projecting from the flange 50 and substantially at right angles to the pin 71. This pin 74 by its engagement with an adjacent shoulder 74' of plate 61 provides a driving connection by which the counterclockwise relation of spindle 47 is communicated to said plate, for transmission by the latter, through pawls 64 and 65 to the cap 52 which carries the boring tool 3. Engaging pin 74 on the opposite side from the shoulder 74' is an arcuate plunger 75; the latter is slidable in an arcuate recess 76 in the pawl plate and is urged against the pin 74 by a coil spring 77 in the bottom of said recess. With this arrangement, and regardless of whether the parts 50, 61 and 52 be stationary, or be rotating counterclockwise in unison, it is evident that any outward radial movement of pin 71 will produce, in response to the camming action between surfaces 72 and 73 the counterclockwise advance of the plate 61 (and with it the cap 52) relative to the flange 50 and spindle 47.

For moving the plunger 71 radially outward the hollow spindle 47 has a rod 78 extending axially therethrough and having an oblique or bevelled inner end 79 for engagement with a similarly bevelled end surface 80 on a wedge 81 which is radially slidable in a groove 82 of the stud 53 forming part of the cap 52. The outer surface of the wedge 81 engages with the inner end of the pin 71 and accordingly any movement of the rod to the right, Figs. 1 and 2, will produce a radially outward movement of the pin 71.

The outer or left hand end of the rod 78 is in a position to be engaged by the head of a bolt 83 which is adjustably mounted in the end of a plunger 84, the latter being slidable in a bore 88 of a cylinder 85 secured to the bridge 7. The plunger 84 is in line with and is engaged by a second plunger 86 slightly larger in diameter than the plunger 84 and slidable in a bore 87 of the cylinder 85, the bore 87 being larger in diameter than the bore 88 in which the plunger 84 is slidable.

The plungers 84 and 86 are arranged to be moved to the right, Fig. 1, upon access of pressure fluid to their respective bores 88 and 87. To this end, as shown in Fig. 4, a conduit 90 extends from pipe 27 to a port 89 of bore 87, behind the plunger 86, and a conduit 92 extends from port 29 to a port 91 behind the plunger 84; said port 91 remains open, despite movement of plunger 86 to the right, by reason of the fact that said plunger has a reduced portion 86' abutting the plunger 84, said reduced portion being only slightly larger than the bore 88. Periodically, at each reversal of the table 2, following the boring operation by tool 3 on each workpiece, the pressure fluid is admitted behind the plunger 86 to give the rod 78 a limited right hand movement which produces, as hereinafter described, a temporary back-off or inward displacement of the tool—this preventing the newly-finished bore from being scratched or marred by the tool on said return or reverse stroke of the table. Also, at less frequent and irregular intervals, said rod 78 may be given a more extended right hand movement, brought about by admission of the pressure fluid behind the plunger 84 on those occasions when the gage 22 is unable to enter a finished workpiece bore—this producing as hereinafter described, an outward repositioning of the tool which compensates for the wear that has resulted in an offsize workpiece. The operation of the mechanism is as follows:

With a workpiece a suitably held in the work holder 4 by clamp 5, a movement of the table 2 to the left, for a boring operation on said workpiece is initiated by manual shifting of the reversing lever 9, either directly or through the medium of a control lever 93 on the front of the machine, thereby shifting the reversing valve 10 to establish a fluid connection from the pump 13 to the right hand end of the table cylinder 11, and also, through conduit 26 against the left hand end of gage-moving plunger 24, to hold the gage 22 away from the end of the workpiece. The table 2 consequently moves to the left, Fig. 1, carrying the workpiece a past the rotating tool 3 for a cutting operation on the workpiece bore. As soon as this movement has brought the right hand end of the workpiece a beyond the tool 3, the table 2 is reversed automatically by engagement of dog 8 with lever 9, to rock valve 10 into its other position, thereby initiating a return or right hand movement of table 2; this reverse movement of the table carrying the workpiece a to the right, effects the withdrawal through the finished bore of said workpiece of the tool 3.

As an incident to each such reverse or withdrawal movement, fluid under pressure is directed through conduits 27 and 90, against the outer end of plunger 86, causing a short movement of the latter, which through plunger 84 is communicated to the rod 78 to produce a slight counterclockwise movement of the plate 61, sufficient to obtain an inward radial back-off of tool 3 from its normal operating position, so that said tool on said reverse or withdrawal movement of the workpiece, will be prevented from scratching or marring the finished surface of the workpiece bore. To this end, the aforesaid short right hand movement of rod 78 is utilized to impart, by the surfaces 79 and 80, a short outward movement to the pin 71; by reason of the latter's bevelled engagement at 72, 73 with the pin 74, this outward movement causes a temporary small counterclockwise motion of the plate 61 and cap 52 relative to the flange 50, and accordingly, by reason of the eccentricity of stud 53, the result of this angular motion is a slight radial retraction of the tool 3 from its normal operating position. On such counterclockwise motion of the plate 61 the spring 77 undergoes compression; and thus the force of said spring is available to restore the tool to its normal operating position, after the table's reverse or withdrawal movement has been completed and after the pressure of the fluid against the plunger 86 has been relieved, as the result of rocking the valve 10 to its other position, preparatory to a boring operation on the new workpiece a inserted in the machine.

That is to say, following each boring stroke, there occurs a back-off of the tool 3, so that on the ensuing return or withdrawal stroke, the workpiece bore will not be contacted by said tool. This back-off which is effective on the tool until the boring operation on the next workpiece *a* is started, involves the joint counterclockwise angular movement of plate 61 and cap 52 which is produced by a short endwise displacement of rod 78 under the influence of plunger 86. Such short displacement procures through pin 71, a slight counterclockwise turning of plate 61, less than enough to engage pawl 65 with pin 68, and which is communicated by pawl 65 to the cap 52; consequently, the back-off occurs because of the eccentricity of the stud 53 to the stub shaft 54. At the same time the spring 77 is compressed, and the latter's expansion, occurring when reversing valve 18 is again shifted to relieve the pressure on plunger 86, is made effective through pawl 64 to return the tool each time to its established radial position at the start of a boring operation on a new workpiece.

Also on each reversal of table 2 at the left hand end of its movement, the pressure fluid is directed through conduit 27 and branch conduit 27' against the right hand end of gage-moving plunger 24, causing the gage 22 to enter the finished workpiece 4 if the latter, by the passage therethrough of the tool 3 has been enlarged to the desired size. In those instances that the gage 22 does enter the workpiece bore, indicating that the boring operation performed thereon has produced the desired size, there is no access of the pressure fluid to the conduit 92 and port 91 since the ports 30 and 29 are kept from communicating with each other by the plunger 24, the latter having been permitted by said gage entry to move to its extreme left hand position. In the regular and ordinary operation of the machine, this entry of the gage will be permitted by quite a number of consecutive workpieces, and so long as these conditions prevail there will be no change made in the established radial position of the tool 3, other than its temporary back-off, as above described during each withdrawal stroke of the table.

However, as a result of the gradual wearing down of the tool 3, from a number of such boring operations, said tool may ultimately produce a bore which is undersize, that is, a bore not large enough to permit the entry of the gage 22. When this occurs, on the right hand or withdrawal movement of table 2, the usual movement of the gage 22 to the left is limited by contact between the gage and the end of the workpiece, thereby stopping the plunger 24 in mid-position and establishing, by means of groove 28, a fluid connection between the ports 30 and 29. Accordingly, later on in this same right hand withdrawal movement of the table, when the dog 41 engages and depresses the stem 40 of valve 37 (whether or not workpiece *a* has moved clear of tool 3) the fluid under pressure from pump 13 is admitted by reduced portion 45 of valve 37 to conduit 34, and this fluid, by reason of the stoppage of plunger 24 in mid-position, in the situation above described, is admitted by way of conduit 92 and port 91 against the plunger 84. The ensuing movement of plunger 84 to the right gives the rod 78 an additional right hand movement, over and above that produced as above described, by the plunger 86.

Consequently, in the situation assumed (non-entry of gage 22 into a finished workpiece bore) there is a further movement of rod 78 that, through pin 71, turns plate 61 counterclockwise a little beyond the point where pawl 65 engages, and is made inoperative by, the pin 68. Beyond that point, therefore, the cap 52 carrying tool 3, does not partake of the further slight counterclockwise motion of plate 61. Consequently, when the fluid pressure against plungers 86 and 84 is later relieved at the start of a new boring operation, the spring 77, in causing the clockwise motion that restores the approximate conditions through pawl 64, move cap 52 clockwise a little in excess of the previous counterclockwise motion of said cap.

In other words when spring 77 becomes effective for clockwise restoration of said parts, the point of tool 3, because of the eccentric mounting of cap 52, will be set slightly out from its previously established position. In this way the tool is repositioned automatically, in response to each non-entry of gage 22 into any finished workpiece bore to compensate for the wear that has resulted in an undersize bore. Following each such repositioning of the tool 3, the machine operations continue on a succession of workpieces with a temporary back-off of the tool on each reverse or withdrawal stroke of the table, as above described; if the successive operations so wear down said tool as to cause production of another undersize bore another automatic repositioning of the tool occurs, to compensate for such wear.

I claim:

1. In a boring head, a housing, a spindle journalled therein, a tool carried by and adjustable radially of the spindle, a rod axially movable in the spindle, means responsive to axial movement of the rod for retracting the cutting point of the tool radially of the spindle, and other means responsive to additional movement of the rod in the same direction for procuring adjustment of the operative position of the cutting point of the tool radially of the spindle in a direction opposite to said retracting movement.

2. In a boring machine, a housing, a spindle journalled therein, a tool carried by and adjustable radially of the spindle, a rod axially movable in the spindle, means responsive to axial movement of the rod for procuring an inward movement of the tool radially of the spindle, means responsive to additional axial movement of the rod in the same direction for adjusting the position of the cutting point of the tool outwardly radially of the spindle, and separate fluid pressure actuated means for actuating the rod for each of the shifting and adjusting movements of the tool.

3. In a boring machine, a housing, a spindle journalled therein, a tool carried by and adjustable radially of the spindle, a rod axially movable in the spindle, means responsive to axial movement of the rod for procuring an inward movement of the tool radially of the spindle, means responsive to additional axial movement of the rod for procuring adjustment of the operative position of the cutting point of the tool outwardly radially of the spindle, and separate means for procuring each axial movement of the rod.

4. In a boring machine, a housing, a spindle journalled therein, a cap eccentrically mounted on the end of the spindle, a boring tool carried by the cap, and means operable independently of the spindle rotation for shifting the cap angularly of the spindle in a direction to move the boring tool inwardly radially of the spindle.

5. In a boring machine, a housing, a spindle journalled therein, a cap eccentrically mounted on the end of the spindle, a boring tool carried by the cap, means operable independently of the spindle rotation for shifting the cap angularly of the spindle in a direction to move the boring tool inwardly radially of the spindle, and a fluid pressure actuator for said means.

6. In a boring machine, a housing, a spindle journalled therein, a cap eccentrically mounted on the end of the spindle, a boring tool carried by the cap, a rod axially slidable in the spindle, a plate turnable relative to the spindle in response to axial movement of the rod, a pawl on said plate, and a ratchet on said cap for procuring turning movement of the cap with said plate.

7. In a boring machine, a housing, a spindle journalled therein, a cap eccentrically mounted on the end of the spindle, a boring tool carried by the cap, a rod axially slidable in the spindle, a plate turnable relative to the spindle in response to axial movement of the rod, cooperating pawls on said plate and a ratchet on the cap cooperating therewith, said pawls procuring movement of the cap with said plate, and means for rendering one of said pawls inoperative during a portion of the turning movement of the plate.

8. In a boring machine, a housing, a spindle journalled therein, a tool carried by and adjustable radially of the spindle, a rod axially movable in the spindle, means responsive to axial movement of the rod for procuring an inward movement of the tool radially of the spindle, means responsive to additional axial movement of the rod in the same direction for adjusting the operative position of the cutting point of the tool outwardly radially of the spindle, and a fluid pressure actuated plunger for shifting said rod for the inward movement of the tool.

9. In a boring machine, a housing, a spindle journalled therein, a tool carried by and adjustable radially of the spindle, a rod axially movable in the spindle, means responsive to axial movement of the rod for procuring an inward movement of the tool radially of the spindle, means responsive to additional axial movement of the rod in the same direction for adjusting the operative position of the cutting point of the tool outwardly radially of the spindle, a fluid pressure actuated plunger for said first axial movement of the rod, and an additional fluid pressure actuated plunger for procuring the additional axial movement of the rod.

10. In a machine of the class described, a workholder, a tool holder comprising a housing, a rotary spindle journalled therein and a tool carried by and movable radially of the spindle, means for procuring a boring operation on a workpiece in the workholder and a subsequent relative withdrawal movement of the tool from the workpiece bore by relative axial movement of the workpiece and tool, means operative at the beginning of the withdrawal movement for shifting the tool radially inward of the spindle, said means including an actuating rod axially movable in the spindle, and fluid pressure actuated means for shifting said rod.

11. In a machine of the class described, a workholder, a tool holder comprising a housing, a rotary spindle journalled therein and a tool carried by and movable radially of the spindle, means for procuring a boring operation on a workpiece in the workholder and a subsequent relative withdrawal movement of the tool from the workpiece bore by relative axial movement of the workpiece and tool, means operative at the beginning of the withdrawal movement for shifting the tool radially inward of the spindle, said means including an actuating rod axially movable in the spindle, work calipering means, and means under the control of said work calipering means and operative when a workpiece in the workholder is not finished to the desired dimension for adjusting the normal position of the tool relative to the spindle.

12. In a machine of the class described, a workholder, a tool holder comprising a housing, a rotary spindle journalled therein and a tool carried by and movable radially of the spindle, means for procuring a boring operation on a workpiece in the workholder and a subsequent relative withdrawal movement of the tool from the workpiece bore by relative axial movement of the workpiece and tool, means operative at the beginning of the withdrawal movement for shifting the tool radially inward of the spindle, said means including an actuating rod axially movable in the spindle, work calipering means, and means under the control of said work calipering means and operative when a workpiece in the workholder is not finished to the desired dimension for adjusting the normal position of the tool relative to the spindle, said last adjustment being procured by axial movement of the actuating rod.

13. In a machine of the class described, a workholder, a tool holder, said tool holder including a rotary spindle and a boring tool radially adjustable thereon, work calipering means in a position to test the dimension of a finished workpiece and operative upon separation of the tool from a workpiece in the workholder, fluid pressure actuated means for adjusting said tool relative to the spindle, a valve associated with said work calipering means for directing fluid pressure to said adjusting means only when the work calipering means indicates that the workpiece is not the desired dimension, and other fluid pressure actuated means operative at the beginning of the separation of the tool from the workpiece for shifting the tool inwardly radially of the spindle.

14. In a machine of the class described, a workholder, a tool holder having a rotary spindle on which the tool is mounted, means operable to adjust the position of the tool relative to the axis of rotation of the spindle, a gage brought into action by the completion of the tool's operation on each workpiece in said workholder to test the dimension of the finished surface of said workpiece, a valve associated with said gage, fluid pressure actuated means for operating said adjusting means, said valve directing fluid to said fluid actuating means in response to obstruction of said gage's passage along the tooled surface of the workpiece, and additional fluid pressure actuated means operative at the completion of the tool's operation on each workpiece for shifting the position of the tool relative to the axis of rotation of the spindle in a direction opposite to the aforesaid tool movement by the adjusting means.

15. In a machine of the class described, a boring tool and a workholder, means for imparting rotation to one of said parts, means for traversing one part relatively to the other for a boring operation by said tool on each of a succession of workpieces disposed in said workholder, a gage alined with said workholder to test the bore size of each workpiece, means rendered operative by reversal of said traverse for radially retracting said tool from its previously-established working position and for urging said gage toward the bore just operated upon by said tool, means responsive to the start of the next boring operation for restoring the retracted tool to its established working position, and means responsive to non-entry of said gage into any bore on which said tool has operated for procuring said tool's outward radial projection, by the start of the next boring operation, beyond said previously-established working position.

16. In a machine of the class described, a boring tool and a workholder, means for imparting rotation to one of said parts, means for traversing one part relatively to the other for a boring operation by said tool on each of a succession of workpieces disposed in said workholder, a gage alined with said workholder to test the bore size of each workpiece, means rendered operative by reversal of said traverse for radially retracting said tool from its previously established working position and for urging said gage toward the bore just operated upon by said tool, means responsive to the start of the next boring operation for restoring the retracted tool to its established working position, if said gage on said reverse stroke has entered the bore just operated upon by said tool, and means for procuring by said start of the next boring operation a slight additional outward projection of said tool beyond said previously-established working position, if said bore has not permitted the entry of said gage.

17. In a machine of the class described, a boring tool and a workholder, means for imparting rotation to one of said parts, means for traversing one part relative to the other for a boring operation by said tool on each of a succession of workpieces disposed in said workholder, a gage alined with said workholder to test the bore size of each workpiece, fluid pressure means rendered operative by reversal of said traverse for radially retracting said tool from its previously-established working position and for urging said gage toward the bore just operated upon by said tool, spring means responsive to the start of the next boring operation for restoring the retracted tool to its established working position, and means responsive to non-entry of said gage into any bore on which said tool has operated for procuring said tool's outward radial projection, by the start of the next boring operation, beyond said previously-established working position.

HAROLD L. BLOOD.